United States Patent
Kubo et al.

(10) Patent No.: US 11,113,520 B2
(45) Date of Patent: Sep. 7, 2021

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Shusaku Kubo, Kanagawa (JP); Shigeru Okada, Kanagawa (JP); Masanori Yoshizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 38 days.

(21) Appl. No.: 16/535,083

(22) Filed: Aug. 8, 2019

(65) Prior Publication Data

US 2020/0285847 A1    Sep. 10, 2020

(30) Foreign Application Priority Data

Mar. 7, 2019  (JP) .............................. JP2019-041257

(51) Int. Cl.
 *G06K 9/00* (2006.01)
 *G06K 9/34* (2006.01)
(52) U.S. Cl.
 CPC ..... *G06K 9/00463* (2013.01); *G06K 9/00456* (2013.01); *G06K 9/00469* (2013.01); *G06K 9/344* (2013.01); *G06K 2209/01* (2013.01)

(58) Field of Classification Search
 CPC ...... G06F 16/93; G06F 3/0233; G06F 3/0237; G06F 40/10; G06F 40/131
 See application file for complete search history.

(56) References Cited

U.S. PATENT DOCUMENTS

| | | | |
|---|---|---|---|
| 7,969,598 B2* | 6/2011 | Kishi | G06F 16/93 |
| | | | 358/1.15 |
| 2013/0054644 A1* | 2/2013 | Nakano | G06F 40/10 |
| 2019/0197639 A1 | 6/2019 | Sugaya | |

FOREIGN PATENT DOCUMENTS

| | | |
|---|---|---|
| JP | 2005267052 | 9/2005 |
| JP | 2007148569 | 6/2007 |
| JP | 6290459 | 3/2018 |

* cited by examiner

*Primary Examiner* — Rose Varndell
(74) *Attorney, Agent, or Firm* — JCIPRNET

(57) ABSTRACT

An information processing apparatus includes a reading unit and a determining unit. The reading unit reads a document. The determining unit specifies, based on a result of reading of the document, a first character string representing a date and a second character string representing a period, and determines an attribute of the document in accordance with the first character string and the second character string.

19 Claims, 6 Drawing Sheets

---

Article 7 (Term)
This Agreement shall be effective for a period of one year from this day . The obligations set forth in Article 3 (Confidentiality Obligation) and Article 6 (Compensation for Damages) shall survive for three years after termination of this Agreement .

FIG. 5

Non-Disclosure Agreement

X Corporation (hereinafter "first party") and Y Corporation (hereinafter "second party") agree to the following Articles regarding the management of confidential information disclosed by the other party and conclude the Non-Disclosure Agreement (hereinafter "this Agreement").

Article 1 (Purpose)
The first party and the second party shall confirm that the relationship therebetween is based on mutual trust, faithfully fulfill each stipulation prescribed in this Agreement, and make efforts to keep confidential information of the other party confidential.

Article 2 (Confidential Information)
The "confidential information" in this Agreement shall be all information disclosed in writing, including information about past, present, and future research, development, and business activities of the party concerned disclosed by the first party or the second party to the other party in consideration of the feasibility of cooperation regarding *** performed by the first party and the second party (hereinafter "this consideration"), information clearly indicating that it is confidential, and information that is orally disclosed and that is confirmed to be confidential in writing without delay after disclosure.

Article 3 (Confidentiality Obligation)
The first party or the second party shall not disclose or divulge the details of this Agreement and any confidential information of the other party to any third party without the prior written approval of the other party.
The first party and the second party shall be permitted to disclose confidential information received from the other party under the condition of imposing the same confidentiality obligation as the obligation imposed on the own party in this Agreement on a company whose majority of voting rights of all shareholders is directly or indirectly held by the own party for this consideration.

⋮

Article 7 (Term)
This Agreement shall be effective for a period of one year from this day. The obligations set forth in Article 3 (Confidentiality Obligation) and Article 6 (Compensation for Damages) shall survive for three years after termination of this Agreement.

FIG. 6

Article 7 (Term)
This Agreement shall be effective for a period of one year from this day .
The obligations set forth in Article 3 (Confidentiality Obligation) and
Article 6 (Compensation for Damages) shall survive for three years after termination of this Agreement .

FIG. 8

| KEY INFORMATION | VALUE ATTRIBUTE | POSITIONAL RELATIONSHIP |
|---|---|---|
| FIRST PARTY | Inc., PERSONAL NAME | IMMEDIATELY BEFORE |
| SECOND PARTY | Inc., PERSONAL NAME | IMMEDIATELY BEFORE |
| DATE OF CONTRACT | DATE | IMMEDIATELY AFTER |
| EXPIRATION DATE | DATE, PERIOD | SAME ROW, ON THE RIGHT |

FIG. 9

| KEY INFORMATION | VALUE ATTRIBUTE |
|---|---|
| FIRST PARTY | XYZ Inc. |
| SECOND PARTY | ABC TRADING Inc. |
| DATE OF CONTRACT | OCTOBER 25, 2010 |
| EXPIRATION DATE | ONE YEAR FROM THIS DAY |

FIG. 10

| KEY INFORMATION | VALUE ATTRIBUTE |
|---|---|
| FIRST PARTY | XYZ Inc. |
| SECOND PARTY | ABC TRADING Inc. |
| DATE OF CONTRACT | OCTOBER 25, 2010 |
| EXPIRATION DATE | OCTOBER 24, 2011 |

# INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-041257 filed Mar. 7, 2019.

BACKGROUND

(i) Technical Field

The present disclosure relates to an information processing apparatus and a non-transitory computer readable medium.

(ii) Related Art

A document that has an expiration date or that is to be updated, such as an automobile inspection certificate or a contract, needs to be kept. However, such a document is not constantly necessary and is thus often handled in such a manner that the document is computerized and the original paper file thereof is kept in a warehouse or the like. A technique for managing the expiration date of such a document has been proposed. For example, Japanese Unexamined Patent Application Publication No. 2007-148569 discloses an information processing apparatus including a detector that analyzes image data of a document to detect the type of document; a memory that stores a retention period by the type of document; a calculator that calculates, based on the retention period corresponding to the type of document detected by the detector, a date until which the image data is to be kept; and a management controller that manages the image data based on the calculated date. Japanese Unexamined Patent Application Publication No. 2005-267052 describes a technique of holding a contract start date and a confirmation reference date as contract information and detecting, with a confirmation target detecting apparatus, contract information whose confirmation reference date has come.

Japanese Patent No. 6290459 describes a contract management system that detects keywords from sentences of a contract, recognizes a contract period of the contract in accordance with the detected keywords, and automatically updates the contract period.

SUMMARY

Aspects of non-limiting embodiments of the present disclosure relate to a technique that enables an attribute of a document to be managed even if the attribute, such as an expiration date, is not clearly indicated in the document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a reading unit and a determining unit. The reading unit reads a document. The determining unit specifies, based on a result of reading of the document, a first character string representing a date and a second character string representing a period, and determines an attribute of the document in accordance with the first character string and the second character string.

BRIEF DESCRIPTION OF THE DRAWINGS

An exemplary embodiment of the present disclosure will be described in detail based on the following figures, wherein:

FIG. 5 is a diagram illustrating a document;

FIG. 6 is a diagram illustrating a part of the document;

FIG. 8 is a diagram illustrating the content of a positional relationship database;

FIG. 9 is a diagram illustrating value information; and

FIG. 10 is a diagram illustrating updated value information.

DETAILED DESCRIPTION

1. Configuration

Figure 1:
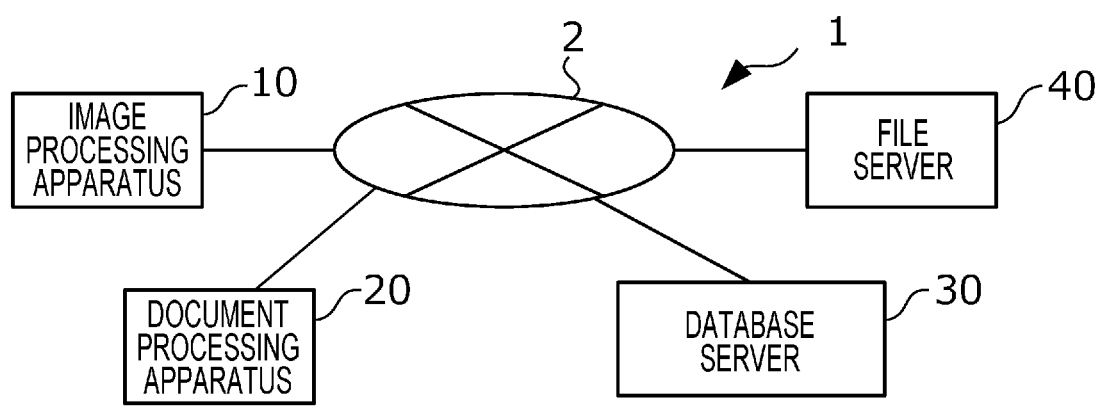
FIG. 1 is a block diagram illustrating a configuration of a system.

FIG. 1 is a block diagram illustrating a configuration of a system 1 according to an exemplary embodiment. The system 1 includes an image processing apparatus 10 (an example of an information processing apparatus), a document processing apparatus 20 (an example of the information processing apparatus), a database server 30, and a file server 40. The image processing apparatus 10 has a copy function and a scan function. The image processing apparatus 10 reads an image of a document as a target to be processed, and generates image data representing the read image. The image processing apparatus 10 is connected to the document processing apparatus 20, the database server 30, and the file server 40 through a communication line 2. The communication line 2 includes at least one of, for example, the Internet, a mobile communication network, a telephone line, and a local area network (LAN).

The document processing apparatus 20 performs various processing operations, such as character recognition, on an image of a document read by the image processing apparatus 10. The database server 30 stores data representing an attribute or the like of the image of the document read by the image processing apparatus 10. The file server 40 stores a file representing the image of the document read by the image processing apparatus 10. The document processing apparatus 20, the database server 30, and the file server 40 are computer apparatuses, such as general-purpose servers. Although a single image processing apparatus 10 is connected to the communication line 2 in the example illustrated in FIG. 1, plural image processing apparatuses 10 may be connected to the communication line 2.

Figure 2:
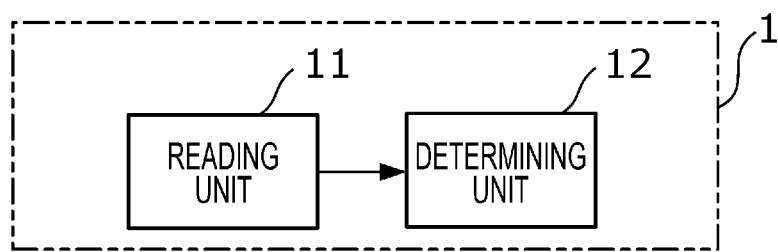
FIG. 2 is a block diagram illustrating a functional configuration of the system.

FIG. 2 is a block diagram illustrating a functional configuration of the system 1 according to the exemplary embodiment. The system 1 includes a reading unit 11 and a determining unit 12. The reading unit 11 reads a document, such as a contract or an automobile inspection certificate. The determining unit 12 specifies, based on a result of reading of the document, a first character string representing a date and a second character string representing a period, and determines an attribute of the document in accordance with the specified first character string and second character string. The determined attribute is, for example, information indicating the expiration date of the document.

Figure 3:
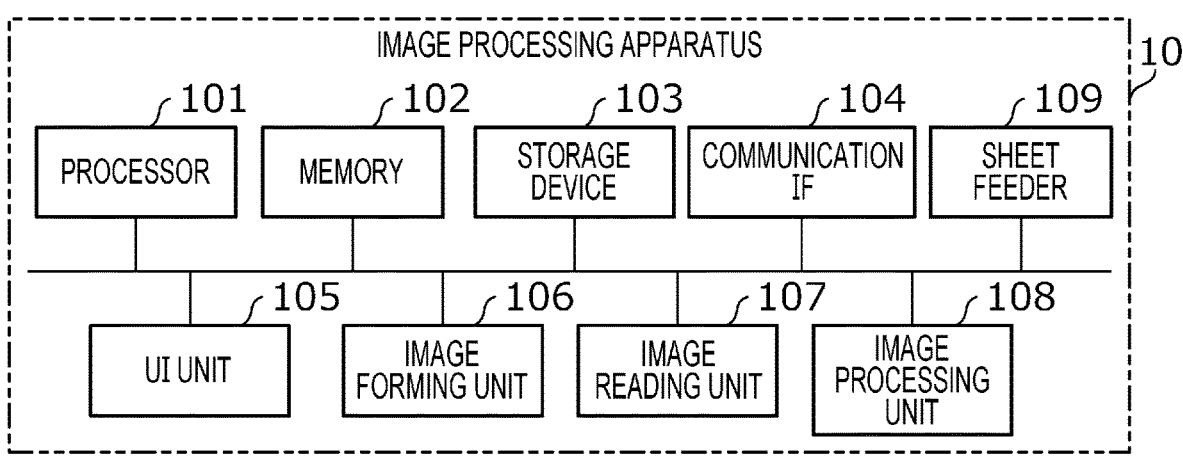
FIG. 3 is a block diagram illustrating a hardware configuration of an image processing apparatus.

FIG. 3 is a block diagram illustrating a hardware configuration of the image processing apparatus 10. A processor 101 controls the other components of the image processing apparatus 10. A memory 102 functions as a work area where the processor 101 executes a program, and includes, for example, a random access memory (RAM). A storage device 103 stores various programs and data and includes, for example, a solid state drive (SSD) or a hard disk drive (HDD). A communication interface (IF) 104 communicates with another apparatus in accordance with a predetermined wireless or wired communication standard (for example, Wi-Fi (registered trademark), Bluetooth (registered trademark), or Ethernet (registered trademark)).

A user interface (UI) unit 105 includes, for example, a touch screen and keys. The UI unit 105 may be built in the image processing apparatus 10 or may be disposed outside the image processing apparatus 10 so as to be connected thereto. An image forming unit 106 forms, using an electrophotographic system or the like, an image on a medium, such as a sheet fed from a sheet feeder 109 along a transport path. An image reading unit 107 optically reads an image on a sheet (medium). An image processing unit 108 includes, for example, a digital signal processor (DSP) or a graphics processing unit (GPU), and performs various image processing operations. The sheet feeder 109 feeds a medium, such as a sheet, to the image forming unit 106.

Figure 4:
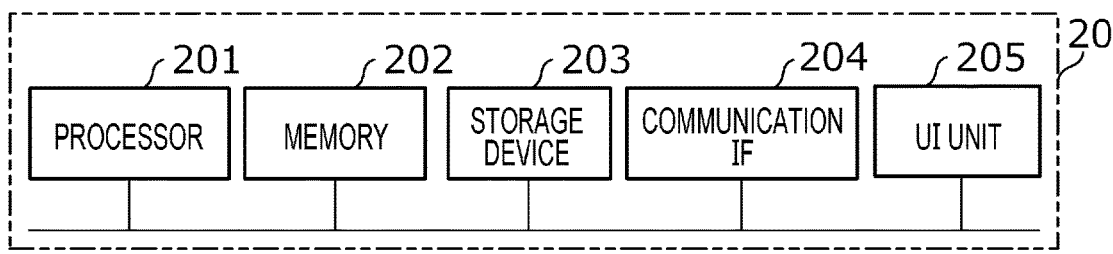
FIG. 4 is a block diagram illustrating a hardware configuration of a document processing apparatus.

FIG. 4 is a block diagram illustrating a hardware configuration of the document processing apparatus 20. A processor 201 controls the other components of the document processing apparatus 20. A memory 202 functions as a work area where the processor 201 executes a program, and includes, for example, a RAM. A storage device 203 stores various programs and data and includes, for example, an SSD or an HDD. A communication IF 204 communicates with another apparatus in accordance with a predetermined wireless or wired communication standard (for example, Wi-Fi (registered trademark), Bluetooth (registered trademark), or Ethernet (registered trademark)). A UI unit 205 includes, for example, a touch screen and keys. The UI unit 205 may be built in the document processing apparatus 20 or may be disposed outside the document processing apparatus 20 so as to be connected thereto.

In this example, a program stored in the memory 102, the storage device 103, the memory 202, or the storage device 203 is executed by the processor 101 or the processor 201, and thereby the functions illustrated in FIG. 2 are implemented. The processor 101 or processor 201 executing the program is an example of the reading unit 11 and the determining unit 12.

FIG. 5 is a diagram illustrating a document as a target to be processed according to the exemplary embodiment. FIG. 6 is an enlarged view of a part of the document illustrated in FIG. 5. FIG. 5 illustrates a "Non-Disclosure Agreement" as a document. In the example illustrated in FIG. 6, it is described that the document is effective "for a period of one year from this day". It is also described that, as an exception to effectiveness, "confidentiality obligation and compensation for damages shall survive for three years after termination of this agreement".

2. Operation

Next, operation according to the exemplary embodiment will be described. In the exemplary embodiment, when the system 1 reads a document and generates an image file representing the document, the system 1 performs processing of giving a document attribute to the image file. The document attribute is, for example, a date on which the document will become necessary.

Figure 7:
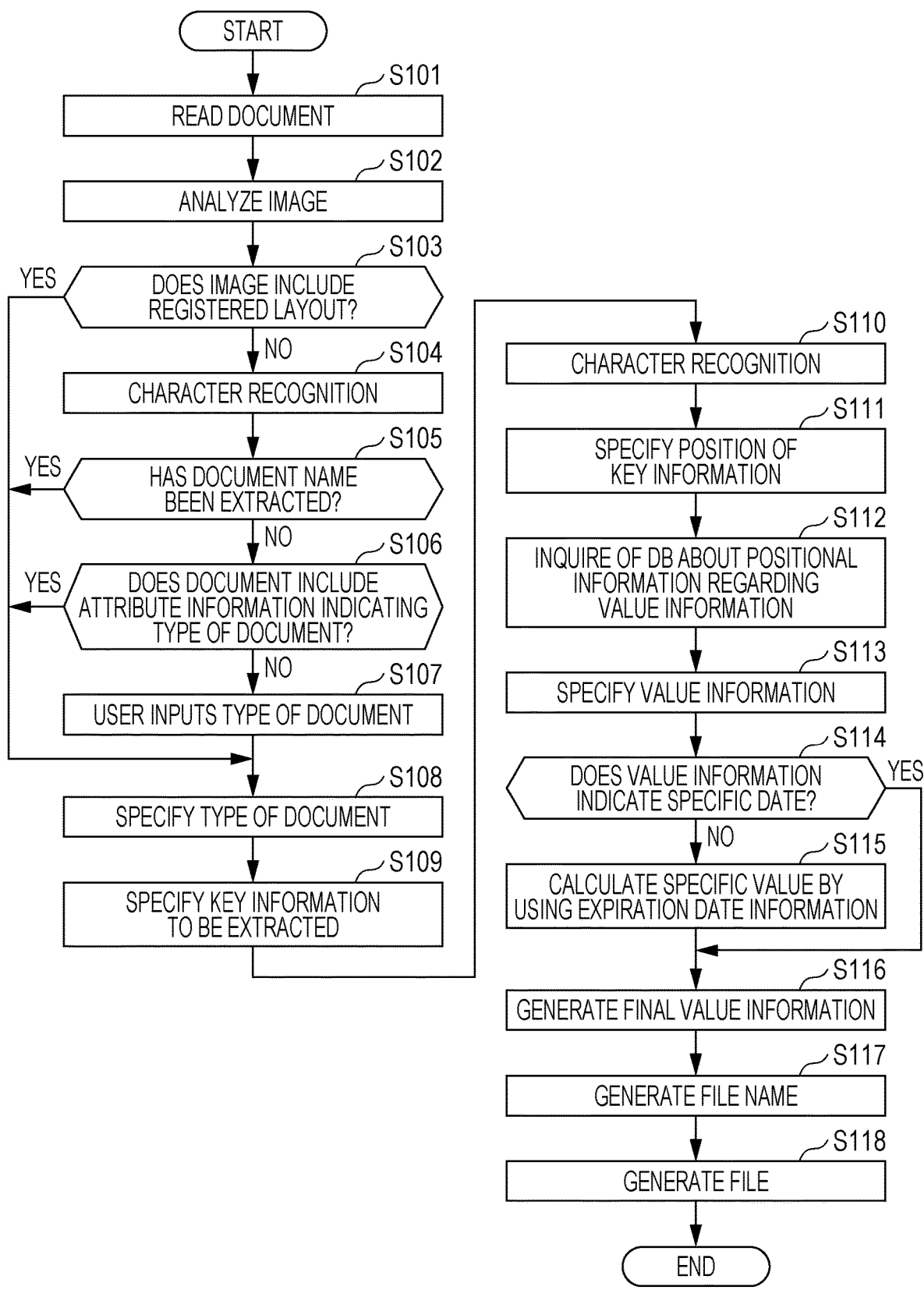
FIG. 7 is a flowchart illustrating the flow of processing performed by the system.

FIG. 7 is a flowchart illustrating the flow of processing performed by the system 1. In step S101, the image processing apparatus 10 reads a document. In the exemplary embodiment, the image processing apparatus 10 reads an image representing a document (hereinafter simply referred to as an "image") by using the image reading unit 107 to generate image data, and performs image processing, such as erecting processing and cleansing processing, on the generated image data. The generated image data is transmitted from the image processing apparatus 10 to the document processing apparatus 20.

In step S102, the document processing apparatus 20 analyzes the layout and the like of the image. For example, the document processing apparatus 20 analyzes the image to extract information, such as the positions of ruled lines in the document, such as a form or the like, and disposition of a document area.

In step S103, the document processing apparatus 20 determines whether the layout of the image that has been analyzed is registered in a document specification database DB1, which is referred to for the purpose of specifying the type of document. If the image does not include a registered layout, the document processing apparatus 20 proceeds to step S104. On the other hand, if the image includes a registered layout, the document processing apparatus 20 proceeds to step S108.

The document specification database DB1 is referred to for the purpose of specifying the type of document and is stored, for example, in the storage device 203 of the document processing apparatus 20. In the document specification database DB1, layout information indicating the layouts of documents or document names are stored in association with the types of documents. The types of documents are, for example, "non-disclosure agreement", "automobile inspection certificate", and so forth.

In step S104, the document processing apparatus 20 performs character recognition (for example, optical character recognition) on a part of the image. In step S105, the document processing apparatus 20 determines whether a document name has been extracted in accordance with a result of the character recognition performed in step S104. If a document name has not been extracted, the document processing apparatus 20 proceeds to step S106. On the other hand, if a document name has been extracted, the document processing apparatus 20 proceeds to step S108. For example, the document processing apparatus 20 may perform layout analysis and extract a character string at a predetermined position as a document name.

In step S106, the document processing apparatus 20 determines whether the document as a target to be processed includes attribute information indicating the type of document. The attribute information is, for example, a character string registered in advance in the document processing apparatus 20. The document processing apparatus 20 determines in step S106 whether the document includes the character string. If the document does not include the attribute information, the document processing apparatus 20 proceeds to step S107. On the other hand, if the document includes the attribute information, the document processing apparatus 20 skips step S107 and proceeds to step S108.

In step S107, the document processing apparatus 20 outputs information that prompts the user to input the type of document. For example, the document processing apparatus 20 may transmit an output request to the image processing apparatus 10, and the image processing apparatus 10 may display a message "please input the type of document" or output a voice message. In this case, the user performs an operation of inputting the type of document by using the UI unit 105 of the image processing apparatus 10. An operation performed on the image processing apparatus 10 by the user causes data corresponding to the operation to be transmitted from the image processing apparatus 10 to the document processing apparatus 20.

In step S108, the document processing apparatus 20 specifies the type of document in accordance with information, such as the layout information of the image or the document name that has been extracted. For example, the document processing apparatus 20 searches the document specification database DB1 for the result of layout analysis and the specified document name, and specifies the type of document associated with the information that has been found through the search. In a case where information indicating the type of document is input by the user, for example, the document processing apparatus 20 specifies the type of document in accordance with the operation performed on the UI unit 105 by the user.

In steps S109 to S113, the document processing apparatus 20 extracts predetermined key information (an example of a first key and a second key) from the document as a target to be processed and specifies, as value information (an example of a first character string and a second character string), a character string that includes a numeral and whose positional relationship in the document with the extracted key information satisfies a predetermined condition. The key information is a character string representing the attribute name of value information. The key information is, for example, "type", "first party", "second party", "date of contract", "expiration date", "date of contract conclusion", or "type of contract". In step S109, the document processing apparatus 20 refers to a key information database DB2 (an example of a memory) and specifies key information (an example of the first key and the second key) that corresponds to the specified type of document and that is to be extracted.

In the key information database DB2, the type of document and key information to be extracted from a document of the type are stored in association with each other. In the exemplary embodiment, "date of contract" and "date of contract conclusion" are examples of the first key, whereas "expiration date" is an example of the second key. Information indicating which key information is the first key and which information is the second key is registered in advance in the key information database DB2. The first key and the second key are stored in the key information database DB2 in association with the type of document. That is, the first key and the second key are associated with each other.

In step S110, the document processing apparatus 20 performs character recognition on the entire document image that has been read, thereby obtaining text data. In step S111, the document processing apparatus 20 specifies, based on a result of the character recognition in step S110, the position of the key information to be extracted. For example, in a case where the key information corresponding to the type specified in step S108 includes five pieces of key information: "type", "first party", "second party", "date of contract", and "expiration date", the document processing apparatus 20 extracts these five terms from the result of the character recognition and specifies the positions of the pieces of key information.

In step S112, the document processing apparatus 20 inquires of a positional relationship database DB3 (an example of the memory) about positional information regarding value information corresponding to the key information.

FIG. 8 is a diagram illustrating the content of the positional relationship database DB3. In the example in FIG. 8, the items "key information", "value attribute", and "positional relationship" are stored in association with each other. As the item "key information" among these items, character strings (for example, "first party", "second party", "date of contract", and "expiration date") extracted as key information from the document are stored. As the item "value attribute", information indicating the attribute of value information corresponding to the key information (for example, "date" and "period") is stored. As the item "positional relationship", information indicating the positional relationship (correspondence) between the key information and the value information in the image of the document is stored. For example, in a case where the key information in the example in FIG. 6 is "expiration date", the database illustrated in FIG. 8 is referred to, and thereby the position of the value information relative to the key information in the document is specified as "same row, on the right".

Referring back to FIG. 7, in step S113, the document processing apparatus 20 specifies value information in accordance with the result of the character recognition. In the exemplary embodiment, a character string whose positional relationship with the key information specified in step S111 satisfies the condition of the positional relationship specified in step S112 is specified as value information.

FIG. 9 is a diagram illustrating the value information specified in step S113. In the example in FIG. 9, "XYZ Inc." is specified as the value information corresponding to the key information "first party", and "ABC Trading Inc." is specified as the value information corresponding to the key information "second party". In addition, "Oct. 25, 2010" is specified as the value information corresponding to the key information "date of contract", and "one year from this day" is specified as the value information corresponding to the key information "expiration date". The value information corresponding to the key information "date of contract" (an example of the first key) is an example of the first character string representing a date. The value information corresponding to the key information "expiration date" (an example of the second key) is an example of the second character string representing a period.

Referring back to FIG. 7, in step S114, the document processing apparatus 20 determines whether the information specified as the value information corresponding to the key information "expiration date" indicates a specific date. If the information does not indicate a specific date, the document processing apparatus 20 proceeds to step S115. On the other hand, if the information indicates a specific date, the document processing apparatus 20 proceeds to step S116.

In step S115, the document processing apparatus 20 calculates a specific value (attribute) by using the key information "expiration date". In the exemplary embodiment, the document processing apparatus 20 determines an attribute of the document in accordance with the value information indicating a date (an example of the first character string) and the value information indicating a period (an example of the second character string) that are specified in step S113. The value information indicating a date is, for example, value information corresponding to the key information "date of contract". The value information indicating a period is, for example, value information corresponding to the key information "period of contract", "expiration date", or "exceptional extension". An attribute of the document is, for example, "expiration date".

Specifically, for example, it is assumed that the character string "Oct. 25, 2010" is specified as the value information corresponding to the key information "date of contract" and that the character string "one year from this day" is specified as the value information corresponding to the key information "period of contract". In this case, the document processing apparatus 20 specifies "Oct. 24, 2011" as an expiration date (an attribute of the document), which is calculated by adding 365 days (1 year) to "Oct. 25, 2010". That is, the document processing apparatus 20 specifies value information indicating a date (the first character string) and value information indicating a period (the second character string) and specifies, as an attribute of the document, a date indicating a result obtained by adding the period represented by the second character string to the date represented by the first character string.

FIG. 10 is a diagram illustrating the details of value information in which the "expiration date" has been updated. In the example in FIG. 10, the expiration date has been updated to the specific date "Oct. 24, 2011".

Referring back to FIG. 7, in step S116, the document processing apparatus 20 generates value information in which the information about the expiration date has been changed. In step S117, the document processing apparatus 20 sets the value information (attribute) generated in step S116 as the file name or profile information of the document as a target to be processed. For example, the document processing apparatus 20 generates a character string "ABC trading_20111024" as a file name by using "ABC trading Inc.", which is the value information corresponding to the key information "second party" and "Oct. 24, 2011", which is the value information corresponding to the key information "expiration date". The document processing apparatus 20 also generates a file (for example, a csv file, hereinafter referred to as an "attribute file") in which the key information and value information extracted from the document as a target to be processed are described in association with each other.

In step S118, the document processing apparatus 20 generates a file that is given the designated value information as a file name. The file is given information indicating a combination of the key information and value information extracted from the document as a target to be processed (see FIG. 10). The generated file is transmitted to the file server 40 and is stored in a storage device of the file server 40. The attribute file describing the combination of the key information and the value information is transmitted to the database server 30 and is stored in a storage device of the database server 30.

A document such as an automobile inspection certificate or a contract has an expiration date and needs to be kept until the next update. However, such a document is not constantly necessary and thus may be handled in such a manner that the document is computerized and the original paper file thereof is kept in a warehouse or the like.

In the case of managing documents such as contracts by computerizing them, a method for organizing the documents varies, for example, the documents may be classified according to company, person in charge, or date, and it is often difficult to find a desired document. Furthermore, the expiration dates or the like of contracts are not managed in many cases, and a trouble of expiration or the like may occur. Thus, pieces of information may be obtained from the contracts and may be managed separately from the contracts. In this case, however, time and efforts are taken, and a mistake of forgetting registration of data may occur.

In contrast, in the exemplary embodiment, a document is managed by being computerized and being given an attribute, such as an expiration date, and thus a trouble of expiration or the like may be less likely to occur.

3. Modification Example

The above-described exemplary embodiment is merely an example for carrying out the present disclosure, and may be modified in the following manner. The above-described exemplary embodiment and each of the modification examples given below may be carried out in combination with each other as necessary.

(1) In the above-described exemplary embodiment, the document processing apparatus 20 extracts predetermined key information (an example of the first key and the second key) from a document as a target to be processed and specifies, as value information (an example of the first character string and the second character string), a character string that includes a numeral and whose positional relationship in the document with the extracted key information satisfies a predetermined condition. The method for specifying value information is not limited to that described in the exemplary embodiment. For example, in a case where the document as a target to be processed is embedded with a two-dimensional barcode or the like including information indicating a date or information indicating a period, the document processing apparatus 20 may read and analyze the barcode to specify the date or period.

(2) In the above-described exemplary embodiment, a single piece of key information or plural pieces of key information may be used to specify a period. In a case where plural pieces of key information are used as key information indicating a period, plural attributes may be specified. For example, a date indicating a result obtained by adding a period indicated by one of the plural pieces of key information to a specified date may be specified as an attribute, and a date indicating a result obtained by adding a sum of periods indicated by the individual pieces of key information to a specified date may be specified as another attribute. Specifically, for example, there is a case where a character string "1 year" corresponding to the key information "period of contract" and a character string "3 years after termination of the contract" corresponding to the key information "exceptional extension" may be specified as value information indicating a period. In this case, the document processing apparatus 20 specifies, as an attribute of the document, a date indicating a result obtained by adding "1 year" and "3 years" to a specified date.

(3) In the above-described exemplary embodiment, information indicating an expiration date is used as an attribute of the document, but an attribute of the document is not limited to the one described in the exemplary embodiment.

(4) In the above-described exemplary embodiment, the image processing apparatus 10 performs character recognition on an image representing a document, thereby specifying a first character string indicating a date and a second character string indicating a period. The method for specifying the first character string and the second character string is not limited to the one described in the exemplary embodiment. For example, in a case where the document to be read is an automobile inspection certificate including a two-dimensional barcode, the image processing apparatus 10 may read the two-dimensional barcode to specify a first character string representing the date of registration.

(5) In the above-described exemplary embodiment, the functions loaded in the image processing apparatus 10 and the functions loaded in the document processing apparatus 20 may be loaded in a single apparatus. Alternatively, the functions loaded in the image processing apparatus 10 and the functions loaded in the document processing apparatus 20 may be provided by being shared among plural apparatuses. For example, a server that performs character recognition and a server that specifies the type of document may be configured as apparatuses separated from each other.

(6) The order of steps in the processing performed in the system 1 is not limited to the example described in the exemplary embodiment. The order of steps in the processing may be changed without inconsistency. An exemplary embodiment of the present disclosure may also be provided as an information processing method executed in the system 1.

(7) In the above-described exemplary embodiment, the programs executed by the processor 101 of the image processing apparatus 10 or the processor 201 of the document processing apparatus 20 may be downloaded through a communication line, such as the Internet. Alternatively, these programs may be provided in the state of being recorded on a computer-readable recording medium, such as a magnetic recording medium (a magnetic tape, a magnetic disc, or the like), an optical recording medium (an optical disc or the like), a magneto-optical recording medium, or a semiconductor memory.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to:
    read a document; and
    specify, based on a result of reading of the document, a first character string representing a date and a second character string representing a period and determine an attribute of the document in accordance with the first character string and the second character string,
    wherein the processor specifies a type of the document and specifies a first key and a second key that correspond to the specified type with reference to a memory that stores correspondences between the type and the first key and between the type and the second key,
    the processor specifies, as the first character string, a character string that includes a numeral and whose positional relationship in the document with the specified first key satisfies a predetermined condition, and
    the processor specifies, as the second character string, a character string whose positional relationship in the document with the specified second key satisfies a predetermined condition.

2. The information processing apparatus according to claim 1, wherein the processor extracts a predetermined first key from the document and specifies, as the first character string, a character string that includes a numeral and whose positional relationship in the document with the extracted first key satisfies a predetermined condition.

3. The information processing apparatus according to claim 2, wherein the processor extracts a predetermined second key from the document and specifies, as the second character string, a character string whose positional relationship in the document with the extracted second key satisfies a predetermined condition.

4. The information processing apparatus according to claim 3, wherein the processor determines, as the attribute, a date indicating a result obtained by adding the period represented by the second character string to the date represented by the first character string.

5. The information processing apparatus according to claim 4, wherein the processor sets the attribute as a file name of the document or profile information of the document.

6. The information processing apparatus according to claim 3, wherein the processor sets the attribute as a file name of the document or profile information of the document.

7. The information processing apparatus according to claim 2, wherein the processor determines, as the attribute, a date indicating a result obtained by adding the period represented by the second character string to the date represented by the first character string.

8. The information processing apparatus according to claim 7, wherein the processor sets the attribute as a file name of the document or profile information of the document.

9. The information processing apparatus according to claim 2, wherein the processor sets the attribute as a file name of the document or profile information of the document.

10. The information processing apparatus according to claim 1, wherein the processor extracts a predetermined second key from the document and specifies, as the second character string, a character string whose positional relationship in the document with the extracted second key satisfies a predetermined condition.

11. The information processing apparatus according to claim 10, wherein the processor determines, as the attribute, a date indicating a result obtained by adding the period represented by the second character string to the date represented by the first character string.

12. The information processing apparatus according to claim 11, wherein the processor sets the attribute as a file name of the document or profile information of the document.

13. The information processing apparatus according to claim 10, wherein the processor sets the attribute as a file name of the document or profile information of the document.

14. The information processing apparatus according to claim 1, wherein the processor determines, as the attribute, a date indicating a result obtained by adding the period represented by the second character string to the date represented by the first character string.

15. The information processing apparatus according to claim 14, wherein the processor sets the attribute as a file name of the document or profile information of the document.

16. The information processing apparatus according to claim 1, wherein the processor sets the attribute as a file name of the document or profile information of the document.

17. The information processing apparatus according to claim 1, wherein the attribute indicates an expiration date of the document.

18. A non-transitory computer readable medium storing a program causing a computer to execute a process, the process comprising:

reading a document;

specifying, based on a result of the reading the document, a first character string representing a date and a second character string representing a period, and determining an attribute of the document in accordance with the first character string and the second character string;

specifying a type of the document and specifies a first key and a second key that correspond to the specified type with reference to a memory that stores correspondences between the type and the first key and between the type and the second key;

specifying, as the first character string, a character string that includes a numeral and whose positional relationship in the document with the specified first key satisfies a predetermined condition; and specifying, as the second character string, a character string whose positional relationship in the document with the specified second key satisfies a predetermined condition.

19. An information processing apparatus comprising:

reading means for reading a document; and determining means for specifying, based on a result of reading of the document, a first character string representing a date and a second character string representing a period and for determining an attribute of the document in accordance with the first character string and the second character string, the determining means specifies a type of the document and specifies a first key and a second key that correspond to the specified type with reference to a memory that stores correspondences between the type and the first key and between the type and the second key, the determining means specifies, as the first character string, a character string that includes a numeral and whose positional relationship in the document with the specified first key satisfies a predetermined condition, and the determining means specifies, as the second character string, a character string whose positional relationship in the document with the specified second key satisfies a predetermined condition.

\* \* \* \* \*